(12) United States Patent
Andrews et al.

(10) Patent No.: US 6,317,871 B1
(45) Date of Patent: Nov. 13, 2001

(54) SYSTEM FOR ENSURING THE ACCURACY OF FILE STRUCTURES IN A SOURCE-TO-SOURCE COMPUTER PROGRAM TRANSLATOR

(75) Inventors: Kristy A. Andrews, Palo Alto; Paul Del Vigna, San Jose, both of CA (US); Mark E. Molloy, Knoxville, IA (US)

(73) Assignee: Compaq Computer Corporation, Houston, TX (US)

( * ) Notice: Subject to any disclaimer, the term of this patent is extended or adjusted under 35 U.S.C. 154(b) by 0 days.

(21) Appl. No.: 09/118,477

(22) Filed: Jul. 17, 1998

Related U.S. Application Data
(60) Provisional application No. 60/053,045, filed on Jul. 18, 1997.

(51) Int. Cl.[7] .................................................... G06F 9/45
(52) U.S. Cl. ....................................................... 717/5; 717/8
(58) Field of Search ............................ 395/705, 709, 395/500.21; 707/3, 4, 101; 704/8; 716/20; 717/5, 9

(56) References Cited

U.S. PATENT DOCUMENTS

| | | | |
|---|---|---|---|
| 4,667,290 | 5/1987 | Goss et al. ......................... 717/7 |
| 4,729,096 | 3/1988 | Larson ............................... 717/5 |
| 4,956,809 | * 9/1990 | George et al. ..................... 707/101 |
| 5,148,379 | * 9/1992 | Konno et al. ...................... 714/20 |
| 5,367,683 | * 11/1994 | Brett ................................. 717/9 |
| 5,418,943 | * 5/1995 | Borgida et al. ................... 707/4 |
| 5,477,451 | 12/1995 | Brown et al. ..................... 704/9 |
| 5,640,550 | 6/1997 | Coker ............................... 707/4 |
| 5,754,860 | 5/1998 | McKeeman et al. ............. 717/4 |
| 5,768,564 | * 6/1998 | Andrews et al. ................. 717/5 |
| 5,842,204 | * 11/1998 | Andrews et al. ................. 707/3 |
| 5,852,740 | 12/1998 | Estes ................................. 712/15 |
| 5,903,859 | * 5/1999 | Stone et al. ....................... 704/8 |
| 6,041,330 | 3/2000 | Carman et al. ................... 707/101 |

* cited by examiner

Primary Examiner—Kakali Chaki
Assistant Examiner—Hoang-Vu Antony Nguyen-Ba

(57) ABSTRACT

A system for identifying the file structure of a computer program, preserving the file structure of the code after translation of source code from one high-level computer language to another, combining pieces of a source file that were generated in different translation sessions, and ensuring textual consistency of each piece of generated code in the resultant code files.

6 Claims, 5 Drawing Sheets

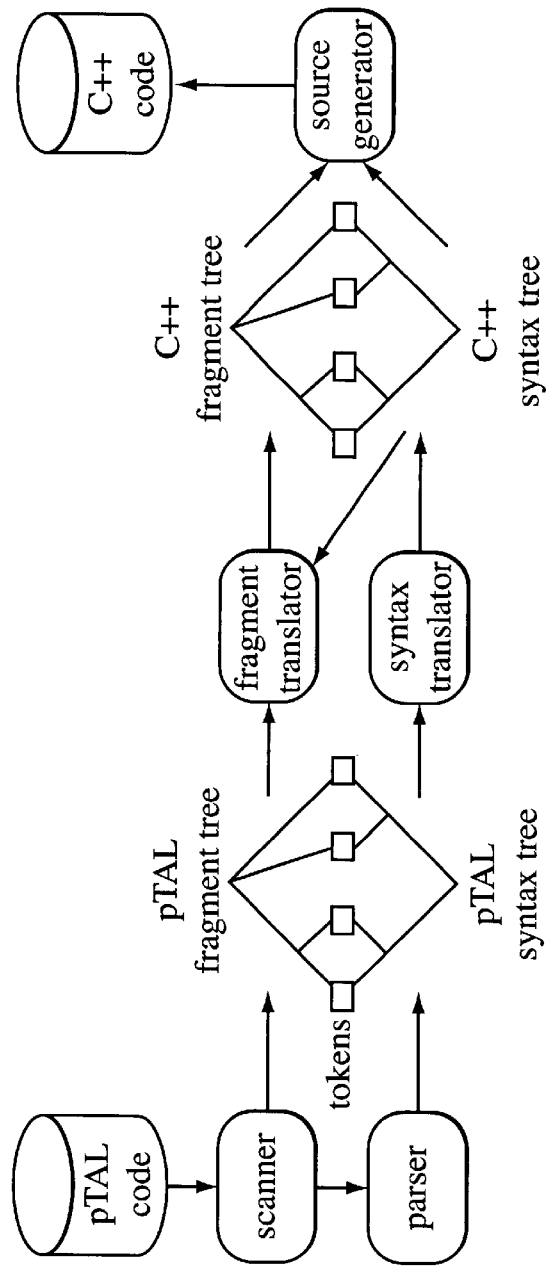

| pTAL Code | Rosetta-Generated C++ Code |
|---|---|
| DEFINE id = s.a[7]#; | #define id s.a[7] |
| . . . | |
| FOR id := 0 TO 9 DO | for (id = 0; id <= 9; ++id) |
| BEGIN | { |
|   a[id] := id; |   a[id] = id; |
| END; | } |

Figure 3: Replicated Code Encapsulated By a Macro

```
INT glob;

DEFINE stuff(a) =    a + 13   #;

DEFINE junk =   ralph   #;

PROC fred;
BEGIN

? IF 15
    INT flag;

? ENDIF 15

INT i := 2;
    i := stuff( i ) ;
END;
```

Figure 4: Static Partitions in a Source Language Code File

First Half of the Fragment Tree

Second Half of the Fragment Tree

```
short glob;

define stuff (a)        a + 13 define junk void fred ()
{ if _15_ endif short i = 2;
    i = stuff (i);
};
```

Figure 7: Static Partitions in a Target Language Code File

SYSTEM FOR ENSURING THE ACCURACY OF FILE STRUCTURES IN A SOURCE-TO-SOURCE COMPUTER PROGRAM TRANSLATOR

CROSS-REFERENCES TO RELATED APPLICATIONS

This application claims priority from Provisional Patent Application Ser. No. 60/053,045 filed Jul. 18, 1997. This application is related to, and incorporates by reference, the following Patents and Applications: Patent application Ser. No. 08/332,966 filed Nov. 1, 1994; Patent application Ser. No. 08/319,682 filed Oct. 7, 1994 now issued as U.S. Pat. No. 5,768,564; and patent application Ser. No. 09/118,403, entitled "System for Automatically Generating Tests to Ensure Binary Compatibility Between Software Components Produced by a Source-To-Source Computer Language Translator" filed on Jul. 17, 1998 on the same day as the present application, said Patent Application deriving from Provisional Patent Application Ser. No. 60/052,955.

BACKGROUND OF THE INVENTION

This invention relates generally to the translation of computer programs and more specifically to a system that ensures that accurate translation occurs in view of software mechanisms that can cause file incompatibilities or other program structural problems in generating a desired translation.

Computer program, or "code," translators are useful for translating a computer program written in a first language (the "original," or "source" language) into a second language (the "target" language). For example, some older languages may become unpopular or outdated making their programs difficult to support because of lack of skilled programmers, lack of compatible computers to execute the code, etc. Or, a company or user of original source code may wish to translate the code to be in the same language as other programs, or to migrate the code to a computer system that doesn't support the original language.

However, the accurate translation of today's computer languages into a target language is made extremely difficult because of "text preprocessor mechanisms." Such mechanisms, such as "include" statements, macros, and conditional compiles, cause changes to the text of a program so that the ultimate program is not discernable from a simple "face value" parsing of the text of the program. Moreover, the program text can change depending on different conditions existing at the time the program is "built" or compiled.

For example, an "include" statement is a common feature of most of today's popular computer languages. Such a statement, when encountered in a computer program, directs the compiler to fetch the text from another file and insert it into the file currently being compiled. Thus, although the include statement is a single line naming an external file, it effectively inserts any amount of computer program instructions into a computer program.

A "macro" is a similar device that can act as a function call that becomes embedded anywhere in the text of the computer program. A macro can be "defined" to be a complicated function of several lines of text that is invoked whenever a designated symbol is used anywhere within the computer program. Thus, the symbol "ID" can be defined to be a macro such as "average(b+daytime, array[15])" so that whenever the symbol "ID" appears in the program, it will be substituted for its definition (i.e., a "macro expansion"). Macros are even more problematic to code translations because macros can be defined to accept parameters that, in turn, need to be inserted in the definition of the macro when it is expanded.

Finally, conditional compile statements allow any number of lines of code to be "conditional compiles" that are only compiled into the final program if the condition is true. For example, one condition can be if "debug=TRUE" then compile the next 200 lines of code. Otherwise the 200 lines of code will not be present in the compiled program.

Other text preprocessor mechanisms are possible. Any text preprocessor mechanism that can alter the program code from its "face value" listing can pose major problems to a translator because the translator can no longer assume that the original code can map line-for-line, or even routine-for-routine or file-for-file, into a target translation. Although such text preprocessor mechanisms allow efficient and compact writing of code, and provide flexible control to programmers, these mechanisms are a major obstacle to code translators.

Thus, it is desirable to provide a system that efficiently ensures that accurate translation of computer programs can take place even in the face of such text preprocessor mechanisms.

SUMMARY OF THE INVENTION

The present invention provides a system for identifying the file structure of a computer program, preserving the file structure of the code after translation of source code from one high-level computer language to another, combining pieces of a source file that were generated in different translation sessions, and ensuring textual consistency of each piece of generated code in the resultant code files.

The invention includes a process that extracts fragment templates and partition templates from a source language text file; checks for textual consistency of the target language code generated for each partition template; pieces together a target language code file from partition templates; and combines pieces of a target language code file that were generated in different translation sessions.

In one embodiment, a method for parsing a source program for translation into a target program of a different language than the source program is provided. The method includes the steps of parsing the program to determine whether a line includes a macro definition; creating a first list having a partition associated with a determined macro definition; and using the partition to generate the target program.

BRIEF DESCRIPTION OF THE DRAWINGS

FIG. 1 shows a parameterized macro definition and invocation;

FIG. 2 provides a diagram overview of the translator of the present invention;

FIG. 3 illustrates replicated code encapsulated by a macro;

FIG. 4 shows static partitions in a source language code file;

FIG. 7 shows static partitions in a target language code file;

DESCRIPTION OF THE SPECIFIC EMBODIMENTS

Figure 5:
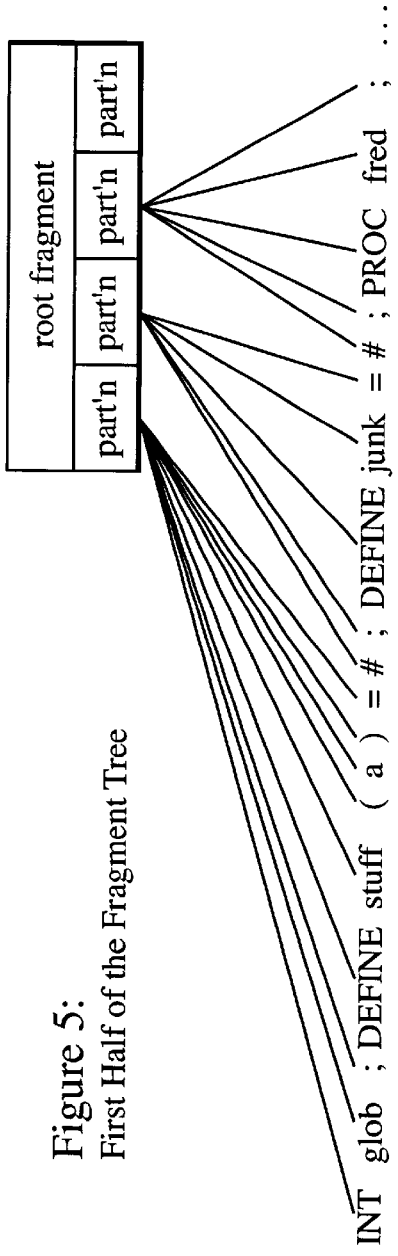
FIG. 5 shows a first half of a fragment tree.

A patent application has already been filed describing a strategy for preserving macro definitions during source-to-source translation: "Method and Apparatus For Translating Source Code From One High-Level Computer Language to Another." It presents a method for translating macro bodies, included files, and conditionally compiled regions of code in their context of use.

An important implication of translating macros, macro actual parameters, and included source in their contexts of use is that resultant source is not available until the translator encounters an example of use. It is useful to allow shared interface files to be translated incrementally. Also, macros, macro actual parameters, included source, and conditionally compiled regions of code that are used more than once must be translated consistently each time, even if the multiple uses are in separate translation sessions. This disclosure describes a method for piecing together text generated from separate source-to-source translation sessions.

DESCRIPTION OF INVENTION

A system for identifying the file structure of a computer program, preserving the file structure of the code after translation of source code from one high-level computer language to another, combining pieces of a source file that were generated in different translation sessions, and ensuring textual consistency of each piece of generated code in the resultant code files.

The Rosetta Translator translates the portable Transaction Application Language (pTAL) to the C++ language (the Rosetta Translator's "source language" is pTAL, and its "target language" is C++). The examples in this document depict pTAL code before translation and C++ code after translation.

This translation strategy is useful for translating legacy software to a different high-level programming language. This strategy preserves text preprocessor mechanisms such as macros, conditionally compiled regions of code, and source inclusion.

These text preprocessor mechanisms can appear anywhere in a source file and contain any portion of a syntactic construct; they need not honor syntactic construct boundaries. Text preprocessor mechanisms need not be implemented by a preprocessor. For example, the following macro and its usage is translated as follows:

| pTAL Code | C++ Code |
|---|---|
| define less(x) = <x #; | #define less(x) < x |
| ... | ... |
| if a less(42) then | if (a less (42)) |
| ... | ... |

FIG. 1: Parameterized Macro Definition and Invocation

Notice that the macro illustrated in FIG. 1 is not a well-formed syntactic entity. That is, it contains part but not all of a relational operation.

Concepts

Virtual Source. A program's virtual source is a stream of tokens that a compiler parses to create a syntax tree representing that program. The virtual source is often the output of a preprocessor. Virtual source typically does not exist in textual form in any single source file; the token stream is created by a series of source file inclusions, macro expansions, and macro formal parameter substitutions.

Virtual Source Production Mechanisms. Virtual source production mechanisms are used by a scanner or preprocessor to create virtual source. Virtual source production mechanisms available in pTAL and C++ are: source inclusion of files, macro expansion, and macro formal parameter substitution.

A virtual source production mechanism can appear anywhere in a source file and its invocation can yield any portion of a syntactic construct; it need not honor syntactic construct boundaries. For example, a macro invocation can appear anywhere in a source file and the resulting macro expansion can yield a portion of a syntactic construct.

Virtual Fragment. A virtual fragment contains the stream of tokens which result from invoking a virtual source production mechanism. Note that some sub-streams of these tokens may themselves represent invocations of virtual source production mechanisms.

Fragment Tree. A fragment tree represents every virtual source production mechanism that was employed to create the virtual source. The leaves of the fragment tree are the tokens of the virtual source. The root of the fragment tree is the source file that a compiler starts reading to perform a compilation. This is treated as a source file "inclusion."

Invocation Syntax. When a text preprocessor recognizes a reference to a macro, for example "mac(5)," it substitutes text from the body of the macro at that point. The tokens representing "mac(5)" compose the invocation syntax for that macro. Macro formal parameters and source file inclusion behave like parameterless macro invocations. The invocation syntax for a macro formal parameter is the name of the formal parameter referenced in the macro body. The invocation syntax for source file inclusion is a preprocessor directive.

Virtual Partition: A virtual fragment contains one or more virtual partitions. A virtual partition is bounded by the beginning or end of a virtual fragment and by directives which control conditional compilation or file sectioning (a feature available in the pTAL language).

Fragment Template: A fragment template is a sequence of tokens that reside in a file, in a macro body, in a macro actual parameter, etc. A virtual fragment is an instance of a fragment template. The pTAL language contains restrictions which allow a fragment template to always be extracted from a text file. This restriction is in principle unnecessary; the current invention covers languages, such as Burroughs ALGOL, which do not have such restrictions and allow, for example, a define expansion to define a new define.

Partition Template: A partition template is a sequence of tokens bounded by fragment template bounds and by directives which control conditional compilation or file sectioning. A virtual partition is an instance of a partition template.

Translator Overview

Figure 8A:
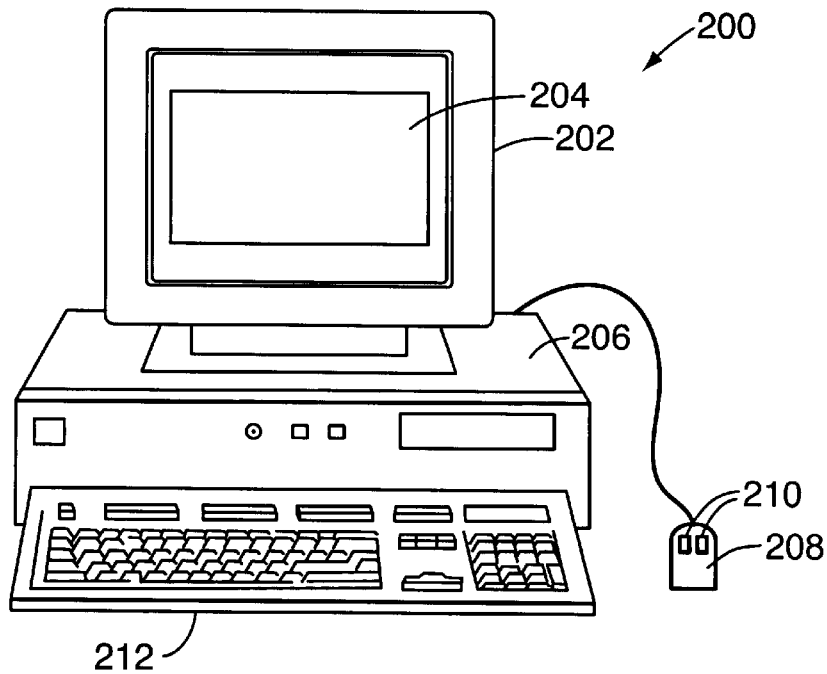
FIG. 8A illustrates a computer suitable for use with the present invention.

FIG. 8A is an illustration of computer system 200 suitable for performing the processing steps of the present invention. Computer system 200 includes display 202 having display screen 204. Cabinet 206 houses standard computer components (not shown) such as a disk drive, CDROM drive, display adapter, network card, random access memory (RAM), central processing unit (CPU), and other components, subsystems and devices. User input devices such as mouse 208 having buttons 210, and keyboard 212 are shown. Other user input devices such as a trackball, touch-screen, digitizing tablet, etc. can be used. In general, the computer system is illustrative of but one type of computer system, such as a desktop computer, suitable for use with the present invention. Computers can be configured with many different hardware components and can be made in many dimensions and styles (e.g., laptop, palmtop, pentop, server, workstation, mainframe). Any hardware platform suitable for performing the processing described herein is suitable for use with the present invention.

Figure 8B:
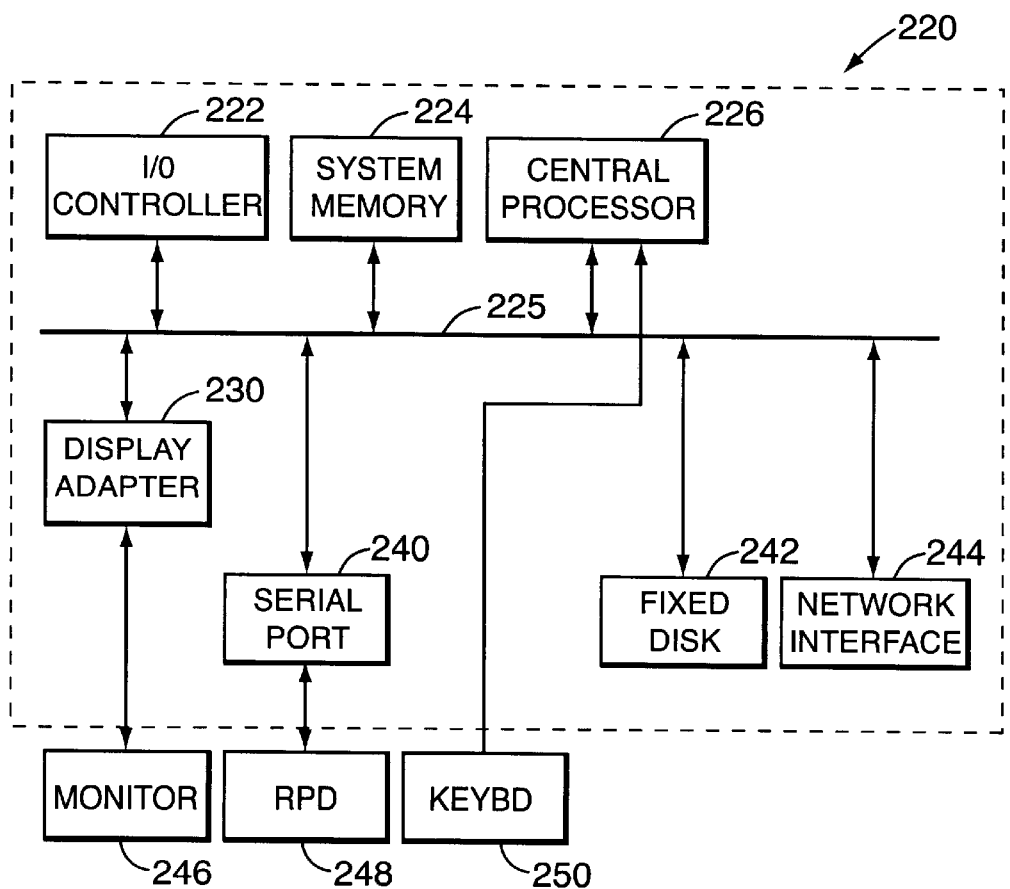
FIG. 8B illustrates subsystems of the computer of FIG. 8A.

FIG. 8B illustrates subsystems that might typically be found in a computer such as computer 200.

In FIG. 8B, subsystems within box 220 are directly interfaced to internal bus 228. Such subsystems typically are contained within the computer system such as within cabinet 206 of FIG. 8A. Subsystems include input/output (I/O) controller 222, System Memory (or "RAM") 224, CPU 226, Display Adapter 230, Serial Port 240, Fixed Disk 242, Network Interface Adapter 244. The use of bus 228 allows each of the subsystems to transfer data among subsystems and, most importantly, with the CPU. External devices can communicate with the CPU or other subsystems via bus 228 by interfacing with a subsystem on the bus. Thus, Monitor 246 connects with Display Adapter 230, a relative pointing device (e.g. a mouse) connects through Serial Port 240. Some devices such as Keyboard 250 can communicate with the CPU by direct means without using the main data bus as, for example, via an interrupt controller and associated registers.

As with the external physical configuration shown in FIG. 8A, many subsystem configurations are possible. FIG. 8B is illustrative of but one suitable configuration. Subsystems, components or devices other than those shown in FIG. 8B can be added. A suitable computer system can be achieved without using all of the subsystems shown in FIG. 8B. For example, a standalone computer need not be coupled to a network so Network Interface 244 would not be required. Other subsystems such as a CDROM drive, graphics accelerator, etc. can be included in the configuration without affecting the performance of the system of the present invention.

The present invention is embodied in a software system for translating source code to target code where the target code is a different computer language from the source code. The software system is referred to as the "Rosetta Translator" made by Tandem Computers, Inc.

In FIG. 2, A source language syntax tree represents the syntactic structure of the virtual source. A source language fragment tree represents the virtual source production mechanisms that were employed to create the virtual source. Explicit tokens appear on the leaves of the otherwise traditional syntax tree. Each of these tokens is also a leaf of the fragment tree, indicating which virtual source production mechanism brought it into the virtual source. The syntax tree and the fragment tree are said to be "joined at the tokens."

The following sections of the above-referenced, incorporated patent applications should be consulted:

Andrews, K., Del Vigna, P., and Molloy, M., "Macro and File Structure Preservation in Source-to-source Translation", *Software—Practice and Experience*, 26(3), March 1996, describes the fragment translator algorithm.

Aho, Sethi, and Ullman, *Compilers: Principles, Techniques, and Tools*, Addison-Wesley, 1985, describes compiler construction and principles.

Andrews, K., Del Vigna, P., and Molloy, M., "Macro and File Structure Preservation in Source-to-source Translation", *Software—Practice and Experience*, 26(3), March 1996, provides a description of source-to-source translation.

FIG. 2: Rosetta Translator Overview

Novel Features

The novel features that this invention disclosure is intended to describe include:
 the extraction of fragment templates and partition templates from a source language text file
 the checking of textual consistency of the target language code generated for each partition template
 the piecing together of a target language code file from partition templates
 the combining of pieces of a target language code file that were generated in different translation sessions Identifying fragment templates and partition templates takes place in the scanner; the rest of this work takes place in the source generator.

Properties of Partitions

This section describes some interesting properties of partitions. The discussion focuses on macros, but the ideas apply as well to macro actual parameters, included files, and conditionally complied regions of code.

A source language partition is semantically equivalent to the target language partition to which it translates. For a macro to "work", it must expand to a meaningful token stream in every context of use in the generated code. For a macro to be readable and maintainable, it must be invoked for the same purposes in the generated code as in the source code; it must provide the same benefit by encapsulating equivalent target language text.

Tokens in a source language virtual partition must be translated in their context or contexts of use. Macros cannot be translated at their point of definition because, even if the text could be parsed, semantic analysis would not be possible. Only when the macro is expanded is the semantic information necessary for translation available. Macros are, for example, translated after they are expanded. Conditionally compiled regions of code are, for example, only translated when the surrounding toggles allow them to be scanned.

An important implication of this property is that shared interface files tend to be translated incrementally, as a side effect of translating the modules that use them.

Every instance of a source language partition template should translate to the same target language text. A macro body is translated once for every expansion in the virtual source. The Rosetta Translator chooses to produce exactly one target language macro for each source language macro; this design decision requires that the translation of every instance of a macro expansion be textually identical. The Rosetta Translator can only be sure that the translation of a macro "works" in every context of use if every instance of the macro expansion translates to textually identical generated code. A textual mismatch might occur, for example, when the syntax expressing two distinct operations is the same in the source language but different in the target language. The pun (one phrase with two distinct meanings) does not translate.

Construct translations should not blur partition boundaries. Each source language syntactic construct is mapped to a corresponding target language syntactic construct, and source language tokens within that construct are mapped to corresponding target language tokens within the corresponding target language construct. While the tokens in the resultant token stream need not maintain the same relative ordering as the source language tokens that generated them, virtual partition boundaries are points of ordering enforcement. Each token in a given target language virtual partition is generated from some token in the same source language virtual partition.

Extracting Partition Templates From a Source File

The Rosetta Translator extracts source language partition templates from a source language code file and assembles target language partition templates into a target language code file. The target language syntax tree can be different from the source language syntax tree, and the target language fragment tree can be different from the source language fragment tree, but the partition template structure visible in a generated source file is exactly the same as that visible in the corresponding input source file.

Recall that partition templates are bounded by:
compiler directives which control conditional compilation or file sectioning
beginning and end of macro bodies in a macro definition
beginning and end of a macro actual parameter
beginning and end of a file Macro actual parameters behave exactly like macro bodies, except that the scope in which actual parameters can be expanded is limited to the body of the macro. Because the translation of a macro body (with actual parameter substitutions replaced by formal parameters, of course) must be textually identical for all contexts of use, and a macro definition can appear in an interface file that is included in the translation of many modules, the Rosetta Translator must perform a consistency check between the translation produced by the first expansion of the macro and the translation produced by each subsequent expansion of the macro. The scope of a macro actual parameter is limited to the macro body itself, so the Rosetta Translator need only perform a consistency check during any particular translation session to ensure that all expansions of a formal parameter within one particular define expansion are textually identical. It need never perform a consistency check between translation sessions.

This property allows replication or reordering of virtual source production mechanism invocation syntax when the encapsulated code is replicated or reordered during syntax translation. Invocation syntax need not have a one-to-one correspondence between the input source file and the output source file.

The Rosetta Translator preserves the define encapsulation when the entire contents of the define is replicated during translation. For example, all uses of the index variable in the translation of the following FOR loop are encapsulated in define invocations.

| pTAL Code | Rosetta-Generated C++ Code |
|---|---|
| DEFINE id = s.a[7]# | #define id s.a[7] |
| ... | |
| FOR id := 0 TO 9 DO | for(id = 0; id <= 9; ++id) |
| BEGIN | { |
| a[id] := id; | a[id] id; |
| END; | } |

FIG. 3: Replicated Code Encapsulated By a Macro

When piecing together partition templates to create a target language code file, the source generator embeds the macro actual parameters in the partition that contains the invocation syntax for the macro. The fragment tree is flattened at macro actual substitution points in creating the text of partition templates.

The following example illustrates the extraction of partition templates from a source language code file.

FIG. 4: Static Partitions in a Source Language Code File

The scanner extracts partition templates from the source language code file. Instances of these partition templates populate the fragment tree.

The following two figures illustrate the pTAL fragment tree that the Rosetta Translator builds after scanning the source file shown above. The sequence of tokens that makes up the leaves of the fragment tree is the fully expanded virtual source. Notice that the beginning and end of each define body forms a partition boundary, as do the ?IF and ?ENDIF compiler directives. The contents of a macro body (a+13 in this example) reside in a macro invocation virtual fragment, and its invocation syntax (stuff () in this example) resides in the invoking virtual fragment.

Partition templates that are not used do not appear in the fragment tree. Assume for this example that the toggle 15 is not set. The conditionally compiled region of code does not appear in the fragment tree, and the body of define junk does not appear in the fragment tree.

Figure 6:
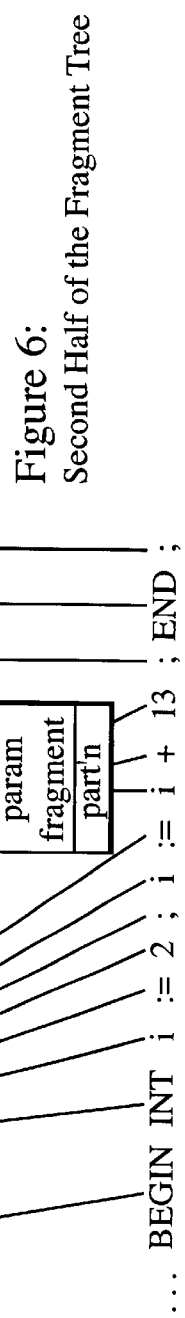
FIG. 6 shows a second half of the fragment tree of FIG. 5.

FIG. 6: Second Half of the Fragment Tree

Building an Output File

The Rosetta Translator pieces together textual representations of instances of target language partition templates to form target language output files, fitting a textual representation of a macro body, for example, into its definition. It also pieces together partitions translated only in previous runs with partitions whose translations have just been completed.

As previously discussed, the text of macro actual parameter fragment templates is collapsed into the invoking partition just before the file is pieced together.

The following example illustrates the assembling of a target language code file. The source generator obtains an instance of each partition template from the target language fragment tree and commits it to text, then writes it to the target language code file. It fits the text representing the body of the macro stuff into the macro definition. Notice that there was no macro invocation fragment for the macro junk, so the resultant code file contains no text for that partition template.

FIG. 7: Static Partitions in a Target Language Code File

The translator must perform consistency checks between newly-generated partitions and previously-generated partitions if the source language text has not changed. Inconsistently translated code can appear in any partition, not just in macro bodies.

The translator must discard previously-generated partitions if the source language text has changed since they were generated.

Partition Template Map

A partition template map is an ordered list of partition templates as they would appear in a code file. A partition template map assumes that macro actual parameters are collapsed into the partition in which the macro invocation appears.

Each partition template in the partition template map is associated with a source language textual rendering of the partition and a target language textual rendering of the partition. Writing the target language textual rendering of each partition template in the order in which they appear in the partition template map creates a target language code file.

A partition template map can describe the partition structure of a file as revealed to the translator in one translation session. A partition template map describing the partition structure of a file for one translation session does not necessarily describe the partition structure of the same file for another translation session, because the toggle settings might be different, exposing different code (which might contain macro definitions) and directives to the translator. Notice that one cannot scan the contents of conditionally compiled regions of code that are not exposed to the translator because the text might not make sense programmatically; there must be a separate translation session for each meaningful set of toggle settings.

Code generated in different translation sessions can be accumulated into one target language file by merging the partition template maps for different translation sessions and merging the corresponding text for each partition. In this way, the Rosetta Translator can build up target language code files incrementally, as their contents are used. The partition template map for a target language code file might not correspond to any single translation session. This partition template map might not be derivable from the target language code itself, so the partition template map corresponding to each file must be saved in some retrievable place.

The partition template map keeps the following information:

A means of identifying the source language text in the partition template (location and size in the file is fine)

A means of identifying the target language text in the partition template (location and size in the file is fine once the text is written to a file; a buffer of text is fine before the output file is built)

An indication of whether or not virtual partition instances exist for the partition template (an untranslated partition has not been scanned during the current translation session, if this partition template map represents the current session, or during any of the accumulated translation sessions that this partition template map represents)

Additional information in the partition template map can be used to improve the performance of the comparisons.

The Rosetta Translator stores partition template map information as text at the end of each generated C++ file protected by toggles to keep it from being compiled. This information could be stored in a database separate from the generated target language text files.

The scanner stores conditional compilation and file sectioning directives as partition boundaries even if they guard text from being scanned. An ?IF directive with a toggle setting that forbids scanning the text that follows is translated even though the partition that it bounds is not.

Which partition templates are translated might differ from translation session to translation session, depending on which defines are used, etc. Include files are normally built up incrementally as the partition templates in them are referenced.

Merging Partition Template Maps

The following algorithm merges two partition template maps, one from the current translation session (currSessionPartMap), and one from a previous translation session (prevSessionPartMap). The main file undergoing translation together with all of the files that it includes and all of the files that the include files include all participate in a translation session.

Operations are as Follows

GetCurrentPartitionMap (file): Returns the current partition template map for file file.
GetPrevPartitionmap (file): Returns the previous translation session's partition template map for file file.
IsCodeFromPrevSession(): TRUE if a previous translation session has generated some target language code for this file.
GetNextPart (pmap): Returns the next partition in the partition template map pmap.
For purposes of presentation of this algorithm: implicit in the partition template map is an iterator.
DescribeSamePartition (partA, partB): Returns TRUE if partA and partB were describing the same partition template.
WasTranslated (part): Returns TRUE if an instance of partition template part exists in the target language fragment tree.
InsertAfter (partA, partB): Insert partAba in the same partition map as partB, inserting immediately after partB.

MergePartitionso

```
FOR (file =
        each file participating in this translation session) BEGIN
    currSessionPartMap = GetCurrentPartitionMap(file)
    prevSessionPartMap = GetPrevPartitionMap(file)
    IF (IsCodeFromPrevSession( )) THEN BEGIN
    currSessionPart = GetNextPart(currSessionPartMap)
    prevSessionPart = GetNextPart(prevSessionPartMap)
    WHILE (prevSessionPart != NULL) BEGIN
        IF (currSessionPart == NULL) THEN BEGIN
            /* Partition map from current session ran dry */
            Append(prevSessionPart,currSessionPartMap)
        END
        ELSE IF (DescribeSamePartition(
                currSessionPart,prevSessionPart)) THEN BEGIN
        IF (WasTranslated(currSessionPart) AND
                    NOT WasTranslated(prevSessionPart))
                THEN BEGIN
            prevSessionPart = GetNextPart(prevSessionPartMap)
            WHILE (NOT DescribeSamePartition(
                    currSessionPart,prevSessionPart))
                currSessionPart = GetNextPart(currSessionPartMap)
            END ELSE IF (NOT WasTranslated(currSessionPart) AND
                    WasTranslated(prevSessionPart))THEN
                    BEGIN
            /* might be multiple Partitions guarded by IF */
            markerPart = currSessionPart
            currSessionPart = GetNextPart(currSessionPartMap)
            WHILE (NOT DescribeSamePartition(currSessionPart,
                    prevSessionPart)) BEGIN
            InsetAfter(prevSessionPart,markerSessionPart)
            prevSessionPart = GetNextPart(prevSessionPartMap)
            /* markerPart gets newly inserted partition */
            markerPart = GetNextPart(currSessionPartMap)
            END
        END ELSE BEGIN
            currSessionPart = GetNextPart(currSessionPartMap)
            prevSessionPart = GetNextPart(prevSessionPartMap)
        END
        END ELSE BEGIN /* don't describe the same Partition */
            /* A partition has been added or deleted from the */
            /* source language file. Discard the previously /*
            /* generated file and remove the partitions added /*
```

```
            /* from that file. */
        END
      END
    END
END
```

The merged partition template map is used to build the source file containing the accumulation of all partitions translated in any translation session so far. The merged partition template map information is saved for use in the next translation session.

The algorithm given here assumes that the source language text does not change between the previous translation session and the current translation session. Heuristics can be applied to cope with new or changed partitions.

Consistency of Target Language Virtual Partitions

The Rosetta Translator's design requires that it must check the textual consistency of every instance of each partition template. Every target language virtual partition created during the current session must be consistent. A textual rendering of a target language virtual partition created during the current translation session must be consistent with the target language text generated for the same partition template in previous translation sessions, if any.

If inconsistent text is generated for different contexts of use, then that code will not be correct for all contexts of use. Such code is unlikely to compile and execute correctly. Serious mismatches can arise in included files or in define bodies. Any time one source language textual sequence can translate to different C-language text in different contexts, there is a danger of generating code that does not compile or execute correctly in every context of use.

Untranslated Define Actual Parameters

Because a define actual parameter must be translated in its context of use, no translation is possible if there is no use of the formal parameter in the define.

For example, consider the following code:

```
?if fast
define d(x) = 7#; ! <--this is define d when settog fast !
?endif fast
?ifnot fast
define d(x) = x * 2#;
?endif fast
proc p;
```

```
begin
  int a := 4;
  int b := 5;
  a := d(b);
end;
```

Suppose the code were translated with the option "SETTOG FAST" set. The code is expanded as follows:

```
define d(x) ...
proc p;
begin
  int a := 4;
  int b := 5;
  a := 7;!Wow!! There's no use of the formal "b"!
end;
```

The expanded pTAL code is translated to the following expanded C++ code:

```
void po (
  int__16 a = 4;
  int__16 b = 5;
  a = 7;
};
```

The resultant C++ code appears as follows:

```
#define d(x) 7
void p() {
  int 16 a = 4;
  int 16 b = 5;
  a = d(/*UA:x*/);
```

The Rosetta Translator emits a special comment "/*UA:x*/" that indicates that no use of the formal parameter x was translated; it holds the place of an untranslated actual parameter corresponding to the formal x. It attaches the special comment to the representation in the fragment tree of the pTAL define actual parameter. The comment is translated to C++ when the define invocation and its attendant actual parameter is translated. In this case, there is no instance (notice that the reference partition is null) of the C++ define actual parameter, so the comment holds its place.

When this code is translated again with the "fast" toggle reset, the fragment subtree does contain a define actual parameter. Suppose the code were translated with the option "RESETTOG FAST" set. The code is expanded as follows:

```
define d(x) ...
proc p;
begin
  int a := 4;
  int b := 5;
  a := b * 2; !There is a use of the actual param "b"!
end;
```

The expanded pTAL code is translated to the following expanded C++ code:

```
void p () {
    int_16 a = 4;
    int_16 b = 5;
    a = b * 2;
```

The resultant C++ code appears as follows:

```
#define d(x) x * 2
void p() {
    int_16 a = 4;
    int_16 b = 5;
    a = d(b);
};
```

The Rosetta Translator performs a consistency check between the fragment containing the invocation of the macro d generated during the current translation session (with the "fast" toggle reset) and the corresponding fragment generated during the previous translation session (with the "fast" toggle set). One translation has an actual parameter in the macro invocation, and one has a special comment holding the place of an untranslated actual parameter ("/*UA:x*/"). The consistency check notices the special comment and replaces it with copies of the actual parameter tokens.

This situation differs from translating a define with no actual parameter provided.

For example, consider the following code:

```
define e(x) = 7 x + #;
proc p;
begin
    int a := 4;
    a := e() 7;
end;
```

The reference partition is empty, not null. The Rosetta Translator emits a warning when it encounters an actual parameter that is empty, because it cannot decide where in the target language define body partition to place the formal parameter associated with the empty actual.

Checking Textual Consistency

The following algorithm compares two virtual partitions token by token. Both of these virtual partitions are instances of the same partition template. This algorithm walks the sequence of tokens in the first virtual partition, comparing each with a token from the second virtual partition. It does not climb the fragment tree, it strictly examines tokens in the given virtual partitions. Note that in order to merge the fragment representing a macro actual parameter that is missing, the algorithm must rise above the textual level.

Operations are as Follows

GetNextToken (virtualPart): Returns a token from the virtual partition virtualPart. This operation is used to iterate over all of the tokens in the virtual partition. Returns NULL when the tokens are exhausted. This operation does not climb the fragment tree; for example, if iterating over the tokens in the partition in the macro invocation fragment shown in FIG. 6, it would return a, then +, then 13. RepresentsUntranslatedActual (token): Returns TRUE if the token token represents an untranslated define actual parameter in a macro invocation. RepresentsActualParamDelimiter (token): Returns TRUE if the token token represents a comma or close (right) parenthesis that completes a macro actual parameter. Notice that the actual parameter may contain a parenthesized list. Copy (token): Returns a copy of the token token.
InsertAfter (token, virtualPart, otherToken): Insert the token othertoken into the virtual partition virtualpart after the token token.
RemoveToken (token): Removes the token token from the virtual partition virtualPart.
Same (token, otherToken): Return TRUE if the tokens represented by token and otherToken have the same image.

Compare(firstInstance,secondInstance)

```
WHILE (token = GetNextToken(firstInstance)) BEGIN
IF ((otherToken = GetNextToken(secondInstance)) == NULL)
    RETURN FALSE
IF (RepresentsUntranslatedActual(token)) THEN BEGIN
    marker = token
    WHILE (NOT RepresentsActualParamDelimiter(otherToken))
    BEGIN
        InsertAfter(token,firstInstance,Copy(otherToken))
        /* token points to inserted token */
        token = GetNextToken(firstInstance)
        otherToken = GetNexttoken(secondInstance)
    END
    /* token points to delimiter */
    token = GetNextToken(firstInstance)
    /* remove the untranslated actual indicator */
    RemoveToken(marker,firstInstance)
END ELSE
IF (RepresentsUntranslatedActual(otherToken)) THEN BEGIN
    marker = otherToken
    WHILE (NOT RepresentsActualParamDelimiter(token)) BEGIN
        InsertAfter(otherToken,secondInstance,Copy(token))
        /* otherToken points to inserted token */
        otherToken = GetNextToken(secondInstance)
        token = GetNextToken(firstInstance)
    END
    /* otherToken points to delimiter */
    otherToken = GetNextToken(secondInstance)
    /* remove the untranslated actual indicator */
    RemoveToken(marker,secondInstance)
END
IF (NOT Same(token,otherToken)) THEN BEGIN
    RETURN FALSE
    END
END
RETURN TRUE
```

The following algorithm checks the consistency of all instances of each partition template in each file that participates in a translation session.

Operations are as follows

GetInstance (part): Returns a virtual partition that is an instance of the partition template part. This routine is used to iterate over all of the virtual partitions in the fragment tree that are instances of the given partition template. Returns NULL when the virtual partitions are exhausted.
TranslatedInPrevSession (part): Returns TRUE if the partition template part was translated in a previous translation session.
ScanTextFromOutputFile (part): Scans the text generated in the output file corresponding to the partition template part, if that partition was translated in a previous translation session. If part was not previously translated, scan nothing. It is useful to scan tokens, so whitespace can be easily ignored during a comparison. PrevTranslation (part): Returns a virtual partition representing a previous translation of the partition template part.

Assuming that
ScanTextFromOutputFile tokenized the text, the partition contains a sequence of tokens; fragment invocations are NOT represented.
ReportError (): Reports an error condition.

CheckConsistenc()

```
MergePartitions( )
FOR (file =
           each file participating in this translation session) BEGIN
    PartMap = GetCurrentPartitionMap(file)
    WHILE (part = GetNextPart(partMap)) BEGIN
        referenceInstance = GetInstance(Part)
        WHILE (instance = GetInstance(part)) BEGIN
            Compare( instance, referenceinstance)
        END
        IF (TranlatedInPrevSession(part)) THEN BEGIN
            ScanTextFromOutputFile(part)
            IF (NOT Compare(PrevTranslation(part), referenceInstance))
                THEN ReportError( )
        END
    END
END
```

It is useful to compare tokens, so whitespace is ignored and the comparison can take place before the stream of tokens is committed to text in case a transformation is necessary.

If a mismatch occurs, it is appropriate to issue an error message, or attempt to manipulate the fragment tree to encapsulate the difference in a new macro formal parameter. The fragment tree transformations necessary to do the latter are described in a previous patent application.

Although the present invention has been discussed with respect to a particular embodiment thereof, it should be understood that the embodiment is but illustrative of one way to practice the present invention, the scope of which is determined solely by the appended claims.

What is claimed is:

1. A method for translating a source program into a target program, the method comprising:

parsing a source program written in a first computer language to determine whether a line includes a macro definition;

creating a first list having a partition associated with the determined macro definition; and using the partition to generate a target program of a second computer language, wherein said second computer language is different from said first computer language.

2. The method of claim 1, further comprising:

generating a second list of partitions; and performing a consistency check between the first and second lists.

3. The method of claim 2, wherein the step of parsing includes:

converting the source program to a stream of tokens;

creating a syntax tree from the tokens;

using a virtual source production mechanism to create a first portion of virtual source code; and
    wherein the step of creating a first list having a partition includes the substep of:
        using one or more tokens to create the partition.

4. The method of claim 3, further comprising:

extracting partition templates from the source program;

assembling the partition templates into a target language code file; and using the target language code file to generate the target program.

5. An apparatus for translating a source program into a target program, the apparatus comprising:

instructions for parsing a source program written in a first computer language to determine whether a line includes a macro definition;

instructions for creating a first list having a partition associated with the determined macro definition; and instructions for using the partition to generate a target program of a second computer language, wherein the second computer language is different from the first computer language.

6. A computer readable media for storing instructions for a process executable on a computer system for translating a source program into a target program, the computer-readable media including:

instructions for parsing a source program written in a first computer language to determine whether a line includes a macro definition;

instructions for creating a first list having a partition associated with the determined macro definition; and instructions for using the partition to generate a target program of a second computer language, wherein the second computer language is different from the first computer language.

* * * * *

UNITED STATES PATENT AND TRADEMARK OFFICE
CERTIFICATE OF CORRECTION

PATENT NO.    : 6,317,871 B1
DATED         : November 13, 2001
INVENTOR(S)   : Andrews et al.

It is certified that error appears in the above-identified patent and that said Letters Patent is hereby corrected as shown below:

<u>Column 5,</u>
Lines 17, 22 and 25, "bus 228" should read -- bus 225 --.
Line 50, "In Fig. 2, A source" should read -- In Fig. 2, a source --.

<u>Column 6,</u>
Line 29, "conditionally complied" should read -- conditionally compiled --.

Signed and Sealed this

Fourteenth Day of May, 2002

*Attest:*

*Attesting Officer*

JAMES E. ROGAN
*Director of the United States Patent and Trademark Office*

UNITED STATES PATENT AND TRADEMARK OFFICE
CERTIFICATE OF CORRECTION

PATENT NO.    : 6,317,871 B1
DATED         : November 13, 2001
INVENTOR(S)   : Andrews et al.

It is certified that error appears in the above-identified patent and that said Letters Patent is hereby corrected as shown below:

Title page,
Item [56], References Cited, add:

--              FOREIGN PATENT DOCUMENTS
EP    0361737 A3, A2    09/89    Mancuso, et al      G06F/9/44
EP    0583117 A2        02/94    Ono, Shigeichi      G06F/9/44

OTHER PUBLICATIONS

Andrews, K., et al., "Macro and File Structure Preservation in Source-to-Source Translation", *Software – Practice and Experience*, March (1996) Vol. 26 (3), pp. 281-292.

Aho, A., et al., Compilers: Principles, Techniques and Tools", Addison-Wesley Publishing Company, (1986) (ISBN 0-201-10088-6); Preface, table of Contents, Chapters 2, 5, and 8.

Wang, Jason T.L., et al., "A Tool for Tree Pattern Matching", Third International Conference on Tools for Artificial Intelligence TAI '91 (CAT. No. 91CH3054-4), pp. 436-444.

Micallef, Josephine, et al., "Support Algorithms for Incremental Attribute Evaluation of Asynchronous Subtree Replacements" *IEEE Transactions on Software Engineering*, (1993) Vol. 19, No. 3, pp. 231-252.
Cardenas, Alfonso F., et al., "Doubly-chained Tree Date Base Organisation – Analysis and Design Strategies" *Computer Journal*, (ISSN 0010-4620, UK) Vol. 20, No. 1, pp. 15-26.

Platoff, M., et al., "An Integrated Program Representation and Toolkit for the Maintenance of C Programs" *Proceedings of the Conference on Software Maintenance, Electrical and Electronics Engineers*, (1991) pp. 129-137.

Ladd, D.A., et al., "A Language for Implementing Language Processors", *IEEE* (1994) (1074-8970/94) pp. 3-5.

International Search Report dated March 6, 1996, PCT/US95/13260.

UNITED STATES PATENT AND TRADEMARK OFFICE
CERTIFICATE OF CORRECTION

PATENT NO. : 6,317,871 B1
DATED : November 13, 2001
INVENTOR(S) : Andrews et al.

It is certified that error appears in the above-identified patent and that said Letters Patent is hereby corrected as shown below:

Minor, S., "Interacting with Structure-Oriented Editors" *Int. J. Man-Machine Studies*, Academic Press Limited (1992) (0020-7373) pp. 399-418.

Robbert, M., et al. "Automated Test Plan Generator for Database Application Systems", ACM, (1991) (089791-396-5) pp. 100-106.

Harrold et al., "Interprocedural Data Flow Testing", ACM (1989) pp. 158-167. --.

Signed and Sealed this

First Day of April, 2003

JAMES E. ROGAN
*Director of the United States Patent and Trademark Office*